United States Patent
Nelson et al.

(10) Patent No.: US 11,939,154 B2
(45) Date of Patent: Mar. 26, 2024

(54) ADJUSTABLE CANOPY FOR A REFUSE VEHICLE

(71) Applicant: Oshkosh Corporation, Oshkosh, WI (US)

(72) Inventors: Joseph Nelson, Oshkosh, WI (US); Jerry Shirley, Oshkosh, WI (US); Reid Behrens, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 652 days.

(21) Appl. No.: 17/006,415

(22) Filed: Aug. 28, 2020

(65) Prior Publication Data

US 2022/0063738 A1 Mar. 3, 2022

(51) Int. Cl.
*B65F 3/02* (2006.01)
*B62D 33/08* (2006.01)
*B62D 33/06* (2006.01)

(52) U.S. Cl.
CPC ............... *B65F 3/02* (2013.01); *B62D 33/08* (2013.01); *B62D 33/06* (2013.01)

(58) Field of Classification Search
CPC ......... B60R 21/11; B62D 33/06; B62D 33/08; B65F 3/02; B65F 3/0203; B65F 3/04; B65F 3/041; B65F 2003/023
USPC ............................... 296/101, 136.02, 190.03
See application file for complete search history.

(56) References Cited

U.S. PATENT DOCUMENTS

| | | | |
|---|---|---|---|
| 3,094,231 A * | 6/1963 | Dempster | B60P 1/50 414/424 |
| 4,091,944 A * | 5/1978 | Gollnick | B65F 3/04 414/407 |
| 4,552,500 A * | 11/1985 | Ghibaudo | B65F 3/26 414/408 |
| 4,909,564 A * | 3/1990 | Pfeifer | B65F 3/04 414/408 |
| 5,697,741 A | 12/1997 | Harris et al. | |
| 5,931,628 A | 8/1999 | Christenson | |
| 6,485,079 B1 | 11/2002 | Brown et al. | |
| 6,666,491 B2 | 12/2003 | Schrafel | |
| 6,918,721 B2 | 7/2005 | Venton-Walters et al. | |
| 6,997,506 B2 | 2/2006 | Hecker | |
| 7,055,880 B2 | 6/2006 | Archer | |
| 7,073,847 B2 | 7/2006 | Morrow et al. | |
| 7,118,314 B2 | 10/2006 | Zhou et al. | |
| 7,264,305 B2 | 9/2007 | Kuriakose | |

(Continued)

FOREIGN PATENT DOCUMENTS

| | | |
|---|---|---|
| CN | 109455157 A | 3/2019 |
| GB | 2 507 405 A | 4/2014 |

OTHER PUBLICATIONS

E-Z Pack Hercules Front Load Garbage Truck (screen shots of video); retrieved Dec. 20, 2022; located at https://www.youtube.com/watch?v=AiK-tDMtez0. (Year: 2020).*

(Continued)

*Primary Examiner* — Jason S Daniels

(74) *Attorney, Agent, or Firm* — Foley & Lardner LLP

(57) ABSTRACT

A refuse vehicle includes a chassis, a body configured to store refuse, a cab coupled to the chassis, and a canopy assembly extending directly above the cab. The canopy assembly includes a main body fixedly coupled to the chassis and an adjustable panel movably coupled to the main body and selectively repositionable relative to the main body.

16 Claims, 11 Drawing Sheets

(56) References Cited

U.S. PATENT DOCUMENTS

| | | | |
|---|---|---|---|
| 7,370,904 B2 | 5/2008 | Wood et al. |
| 7,517,005 B2 | 4/2009 | Kuriakose |
| 7,621,580 B2 | 11/2009 | Randjelovic et al. |
| 7,823,948 B2 | 11/2010 | Redman et al. |
| 7,954,882 B2 | 6/2011 | Brummel et al. |
| 8,152,216 B2 | 4/2012 | Howell et al. |
| 8,376,439 B2 | 2/2013 | Kuriakose et al. |
| 8,794,886 B1 | 8/2014 | Nett et al. |
| 8,967,699 B1 | 3/2015 | Richmond et al. |
| 9,174,686 B1 | 11/2015 | Messina et al. |
| 9,493,093 B2 | 11/2016 | Stingle et al. |
| 9,707,869 B1 | 7/2017 | Messina et al. |
| 9,738,186 B2 | 8/2017 | Krueger et al. |
| 9,809,188 B1 * | 11/2017 | Grant | E02F 9/163 |
| 10,545,010 B1 | 1/2020 | Leeman et al. |
| 10,611,416 B1 | 4/2020 | Groteleuschen et al. |
| 2019/0322321 A1 | 10/2019 | Schwartz et al. |
| 2020/0158474 A1 | 5/2020 | Leeman et al. |
| 2020/0247486 A1 | 8/2020 | Groteleuschen et al. |
| 2020/0262328 A1 | 8/2020 | Nelson et al. |
| 2020/0262366 A1 | 8/2020 | Wildgrube et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0347661 A1 | 11/2020 | Rocholl et al. |
| 2020/0348764 A1 | 11/2020 | Clifton et al. |
| 2020/0360752 A1 | 11/2020 | Shively et al. |

OTHER PUBLICATIONS

English translation of CN 109455157; retrieved via PatentTranslate located at www.epo.org. (Year: 2023).*

Canadian Office Action issued in connection with CA Appl. Ser. No. 3128920 dated Jan. 31, 2023.

* cited by examiner

ADJUSTABLE CANOPY FOR A REFUSE VEHICLE

BACKGROUND

A refuse vehicle is traditionally used to transport material from various waste receptacles within a municipality to a storage or processing facility (e.g., a landfill, an incineration facility, a recycling facility, etc.). Refuse vehicles include cabs that contain at least one operator that controls the refuse vehicle.

SUMMARY OF THE INVENTION

One embodiment relates to a refuse vehicle including a chassis, a body configured to store refuse, a cab coupled to the chassis, and a canopy assembly extending directly above the cab. The canopy assembly includes a main body fixedly coupled to the chassis and an adjustable panel movably coupled to the main body and selectively repositionable relative to the main body.

Another embodiment relates to a canopy assembly for a refuse vehicle. The canopy assembly includes a cover configured to be fixedly coupled to a chassis of the refuse vehicle, a hood pivotally coupled to the cover and selectively rotatable relative to the cover about a lateral axis, and a lip slidably coupled to the hood and selectively repositionable relative to the hood between a plurality of longitudinal positions. The cover, the hood, and the lip define a top surface of the canopy assembly.

Another embodiment relates to a method of installing a canopy onto a refuse vehicle. The method includes providing a refuse vehicle including a chassis, a cab coupled to the chassis, and a body configured to store refuse, fixedly coupling a cover to the chassis such that the cover extends over the cab, movably coupling an adjustable panel to the cover such that the adjustable panel extends over the cab, and adjusting at least one of (a) a position of the adjustable panel relative to the cover or (b) an orientation of the adjustable panel relative to the cover.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Refuse vehicles may include a wide variety of cab configurations and canopies designed for each cab configuration. Certain refuse vehicles, such as front loading refuse vehicles where refuse is lifted directly above the cab, utilize canopies that extend above the cab to protect the cab from contact with contaminants (e.g., refuse, liquid from a refuse container, etc.), which may otherwise damage the cab. The size of the canopy is maximized to cover a large portion (e.g., most, all, etc.) of a top surface of the cab. However, it is undesirable to have the canopy sized and/or positioned to contact the cab, as this contact may also damage the cab (e.g., blemish the paint of the cab). Because different refuse vehicles utilize different cab configurations, different canopies with optimized geometries are produced for each vehicle configuration, which increases the cost of designing and producing each vehicle. If one canopy configuration is used for multiple vehicle configurations, the canopy may not provide adequate cover for the cab, or the canopy may contact the cab.

Referring generally to the Figures, a refuse vehicle includes a reconfigurable canopy assembly. The canopy assembly is coupled to a chassis of a refuse vehicle (e.g., indirectly through a body) and extends over a cab of the refuse vehicle, protecting the cab from contaminants. The canopy assembly includes a cover, which is fixedly coupled to the chassis. A hood is pivotally coupled to the cover such that the hood is selectively rotatable about a lateral axis extending through the center of a hinge. A lip is slidably coupled to the hood and selectively repositionable relative to the hood in a longitudinal direction. By adjusting the positions of the hood and the lip, the canopy assembly can be configured to maximize the area of the cab that is covered while also avoiding contact between the canopy and the cab. This permits a using a single canopy assembly with to provide optimal protection for a variety of different cab configurations without the costs associated with producing different canopy assemblies for each cab configuration.

Figure 1:
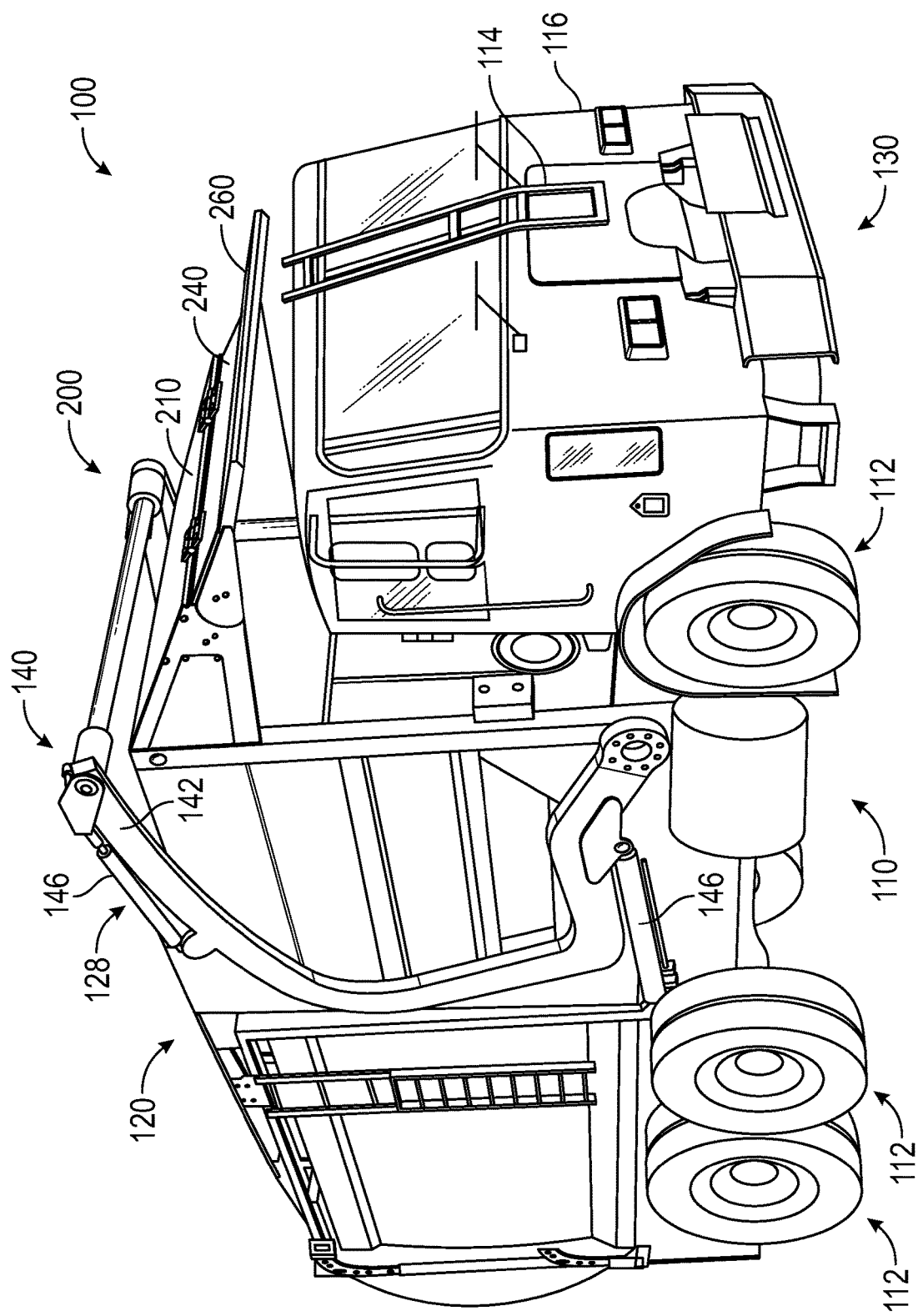
FIG. 1 is a front, left perspective view of a refuse vehicle, according to an exemplary embodiment.
Figure 2:
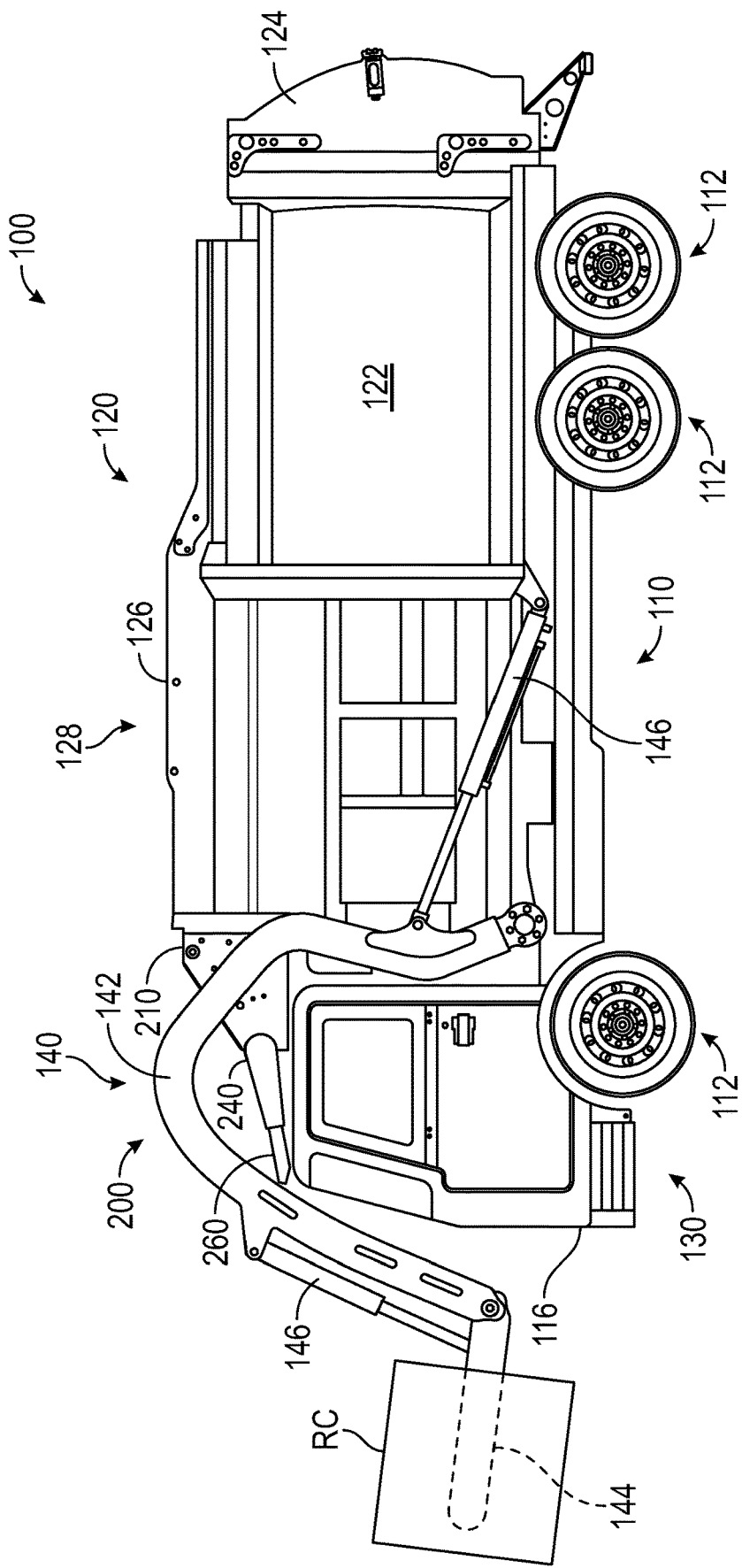
FIG. 2 is a side view of the refuse vehicle of FIG. 1.

In the exemplary embodiment shown in FIGS. 1 and 2, a front end loader, shown as refuse vehicle 100 (e.g., a garbage truck, a waste collection truck, a sanitation truck, etc.), is configured as a front-loading refuse truck. In other embodiments, the refuse vehicle 100 is configured as a side-loading refuse truck or a rear-loading refuse truck. In still other embodiments, the refuse vehicle 10 is configured as another type of vehicle (e.g., a skid-loader, a telehandler, a plow truck, a boom lift, a construction vehicle, etc.). As shown in FIG. 1, the refuse vehicle 100 includes a frame, shown as chassis 110, coupled to a series of tractive elements (e.g., wheel and tire assemblies, tracks, etc.), shown as wheel and tire assemblies 112. The wheel and tire assemblies 112 support the refuse vehicle 100 on a support surface (e.g., the ground). A primary driver (e.g., an electric motor, an internal combustion engine, etc.), shown as primary driver 114, is coupled to the chassis 110. The primary driver 114 is configured to provide rotational mechanical energy to power one or more systems of the refuse vehicle 100 (e.g., a pneumatic system, a hydraulic system, etc.) and/or to drive one or more of the wheel and tire assemblies 112 to propel the refuse vehicle 100. The refuse vehicle 100 may include various forms of stored energy, such as batteries, capacitors, or fuel tanks (e.g., storing gasoline, diesel, bio-diesel, ethanol, natural gas, etc.), that power the primary driver 114.

As shown in FIG. 1, the refuse vehicle 100 further includes a front cabin, shown as cab 116, coupled to the chassis 110 (e.g., positioned at a front end thereof). As shown, the cab 116 is positioned above the primary driver 114. The cab 116 is configured to contain one or more operators during operation of the refuse vehicle 100. The cab 116 may include various components to facilitate operation of the refuse vehicle 100 by an operator (e.g., a seat, a steering wheel, hydraulic controls, a user interface, switches, buttons, dials, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the chassis 110 is coupled to a storage compartment or body assembly, shown as body 120. The body 120 includes a plurality of panels, shown as panels 122, a tailgate 124, and a cover 126. The panels 122, the tailgate 124, and the cover 126 define a collection chamber (e.g., hopper, etc.), shown as refuse compartment 128. Loose refuse may be placed into the refuse compartment 128 where it may thereafter be compacted. The refuse compartment 128 may provide temporary storage for refuse during transport to a waste disposal site and/or a recycling facility. In some embodiments, at least a portion of the body 120 and the refuse compartment 128 extend in front of the cab 116. According to the embodiment shown in FIG. 1, the body 120 and the refuse compartment 128 are positioned behind the cab 116. In some embodiments, the refuse compartment 128 includes a hopper volume and a storage volume. Refuse may be initially loaded into the hopper volume and thereafter compacted into the storage volume. According to an exemplary embodiment, the hopper volume is positioned between the storage volume and the cab 116 (i.e., refuse is loaded into a position of the refuse compartment 128 behind the cab 116 and stored in a position further toward the rear of the refuse compartment 128). In other embodiments, the storage volume is positioned between the hopper volume and the cab 116 (e.g., a rear-loading refuse vehicle, etc.).

The refuse vehicle 100 further includes an actuator assembly, shown lift assembly 140, coupled to the chassis 110. The lift assembly 140 includes a pair of supports, shown as lift arms 142, pivotally coupled to the chassis 110. A pair of engagement devices, shown as lift forks, are pivotally coupled to a distal end of the lift arms 142. Movement of the lift arms 142 and the lift forks 144 are controlled by a series of actuators (e.g., electric actuators, hydraulic actuators, pneumatic actuators, linear actuators, etc.), shown as hydraulic cylinders 146. In operator, the lift forks 144 are engaged with a refuse container RC (e.g., a dumpster, a can, etc.). The hydraulic cylinders 146 are controlled to lift the refuse container RC over the cab 116, inverting the refuse container RC over the body 120 to empty the contents of the refuse container RC into the refuse compartment 128. The hydraulic cylinders 146 are subsequently controlled to lower the refuse container RC and disengage the lift forks 144 from the refuse container RC.

Figure 3:
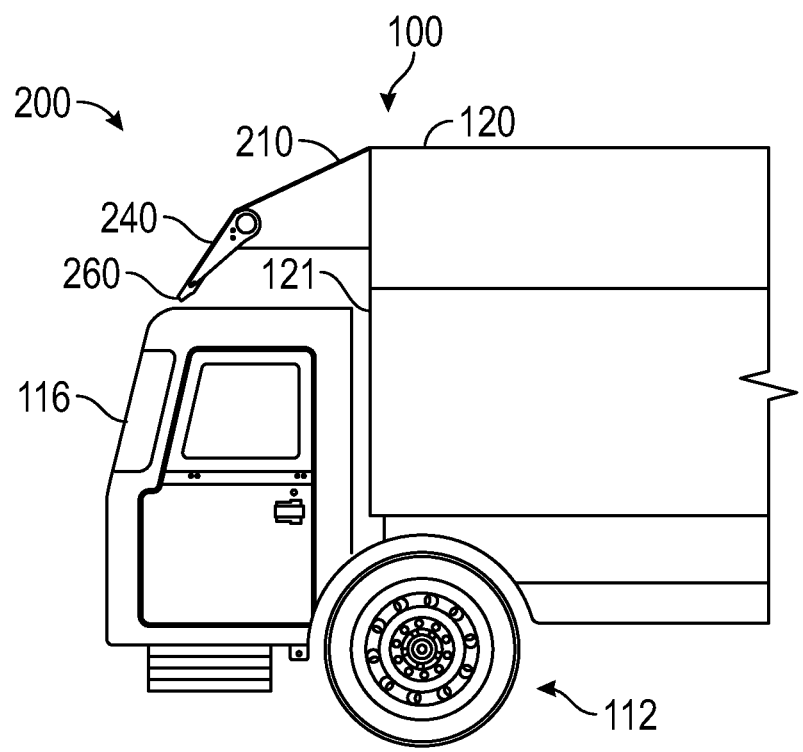
FIG. 3 is a side view of a refuse vehicle, according to an exemplary embodiment.
Figure 4:
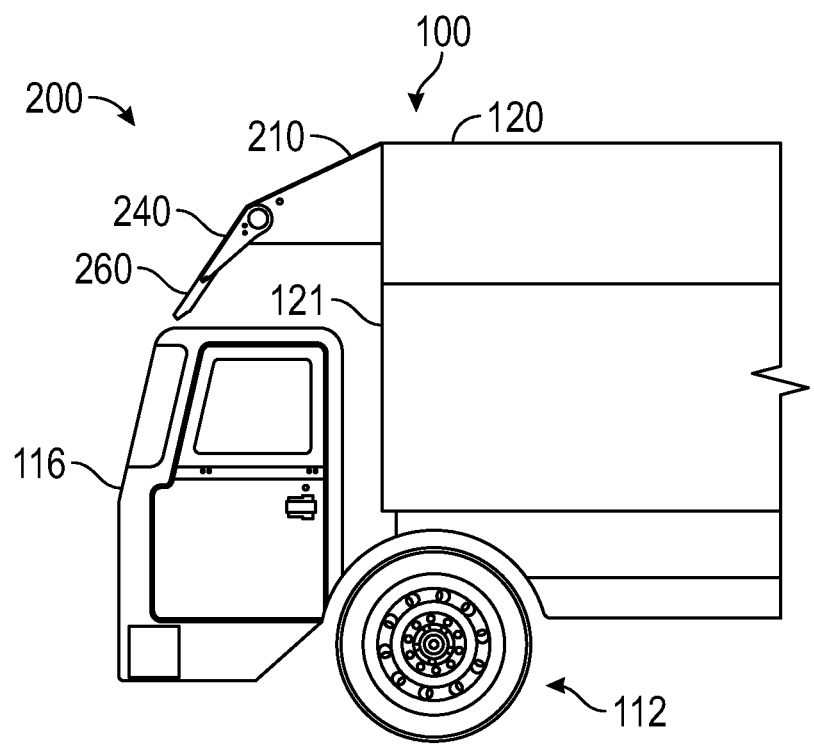
FIG. 4 is a side view of a refuse vehicle, according to an exemplary embodiment.

FIGS. 3 and 4 illustrate alternative embodiments of the refuse vehicle 100, each with a different configuration (e.g., size, shape, location, etc.) of the cab 116. A top surface of the cab 130 of FIG. 3 is positioned relatively lower than a top surface of the cab 130 of FIG. 2. A front surface of the cab 130 of FIG. 2 is positioned relatively farther forward than a front surface of the cab 130 of FIG. 3. A top surface of the cab 130 of FIG. 4 is positioned relatively lower than the top surface of the cab 130 of FIG. 3. A front surface of the cab 130 of FIG. 4 has approximately the same longitudinal position as the front surface of the cab 130 of FIG. 3. In other embodiments, the cab 130 is otherwise configured.

Referring collectively to the exemplary embodiments shown in FIGS. 1-4, the refuse vehicle 100 also includes a cover or canopy, shown as canopy assembly 200, coupled to the body 120. The canopy assembly 200 extends forward from the body 120, above the cab 130, such that the canopy assembly 200 covers the cab 130 to prevent contaminants (e.g., liquid or debris from the refuse container RC that is lifted by the lift assembly 140, hail, rain, debris from other vehicles, etc.) from coming into direct contact with the cab 130. Because the canopy assembly 200 prevents the contaminants from falling directly onto the cab 130, the canopy assembly 200 reduces the possibility for damage to the cab 130.

The canopy assembly 200 includes a main body or fixed panel, shown as cover 210, a rotatable portion or adjustable panel, shown as hood 240, and an extendable portion or adjustable panel, shown as lip 260. The cover 210 is directly (e.g., fixedly, removably, etc.) coupled to a front wall of the body 120. The hood 240 is pivotally coupled to the cover 210, and the lip 260 is slidably or translatably coupled to the hood 240. Accordingly, the hood 240 and the lip 260 are selectively repositionable relative to the cover 210. Referring specifically to FIGS. 2-4, the canopy assembly 200 is shown in a plurality of different configurations, each suited to a different cab arrangement. During assembly of the refuse vehicle 100, the canopy assembly 200 may be reconfigured based on the relative size, shape, and/or location of the cab 130. By way of example, the hood 240 may be rotated downward or upward to accommodate a cab 130 that is relatively short or tall, respectively. By way of another example, the hood 240 may be rotated downward or upward to accommodate a cab 130 that is positioned relatively low or high, respectively. By way of another example, the lip 260 may be extended or retracted to accommodate a cab 130 that is relatively long or short, respectively, in a longitudinal direction (i.e., a direction extending between the front and the rear of the refuse vehicle 100). By way of another example, the lip 260 may be extended or retracted to accommodate a cab 130 that is positioned relatively toward the front or the rear of the refuse vehicle 100, respectively. Due to the adjustability of the hood 240 and the lip 260, one embodiment of the canopy assembly 200 may be utilized with a variety of different cab configurations, optimizing the performance of the canopy assembly 200 while reducing the manufacturing costs that would be associated with producing different models for different refuse vehicles. The canopy assembly 200 can also be adjusted such that the distal end of the canopy assembly 200 (e.g., the end of the lip 260) is spaced from the cab 130, preventing contact between the canopy assembly 200 and the cab 130 and the associated wear.

Figure 5:
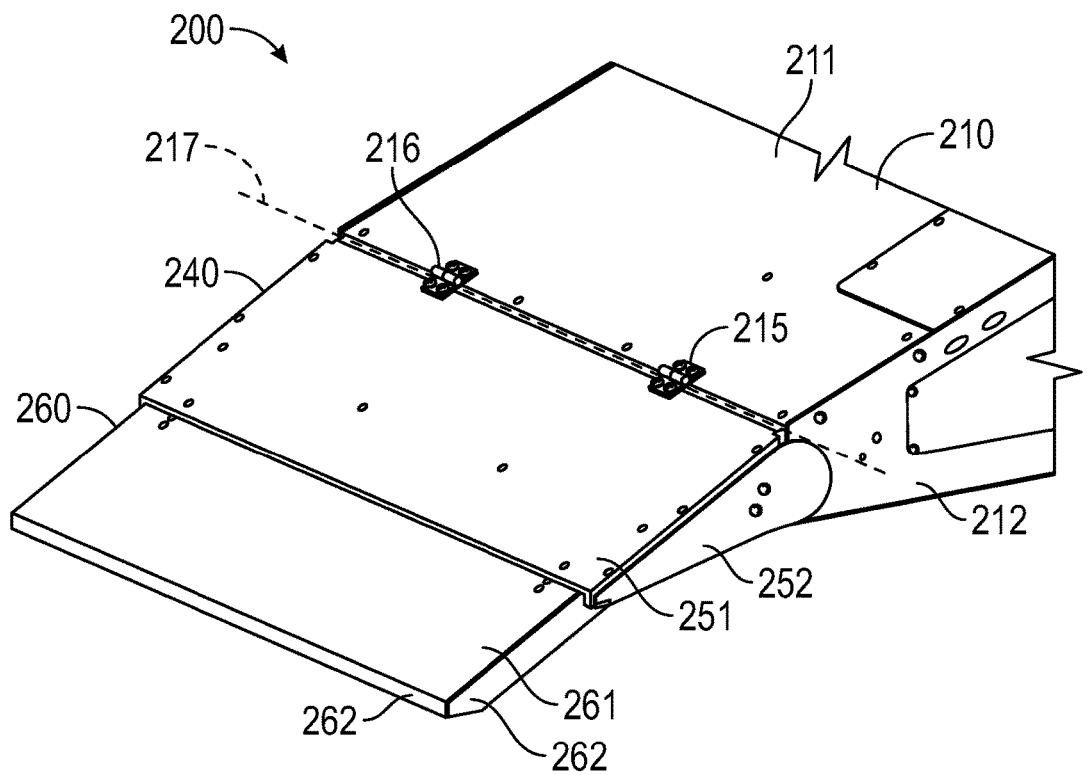
FIG. 5 is a top, right perspective view of a canopy for a refuse vehicle, according to an exemplary embodiment.
Figure 6:
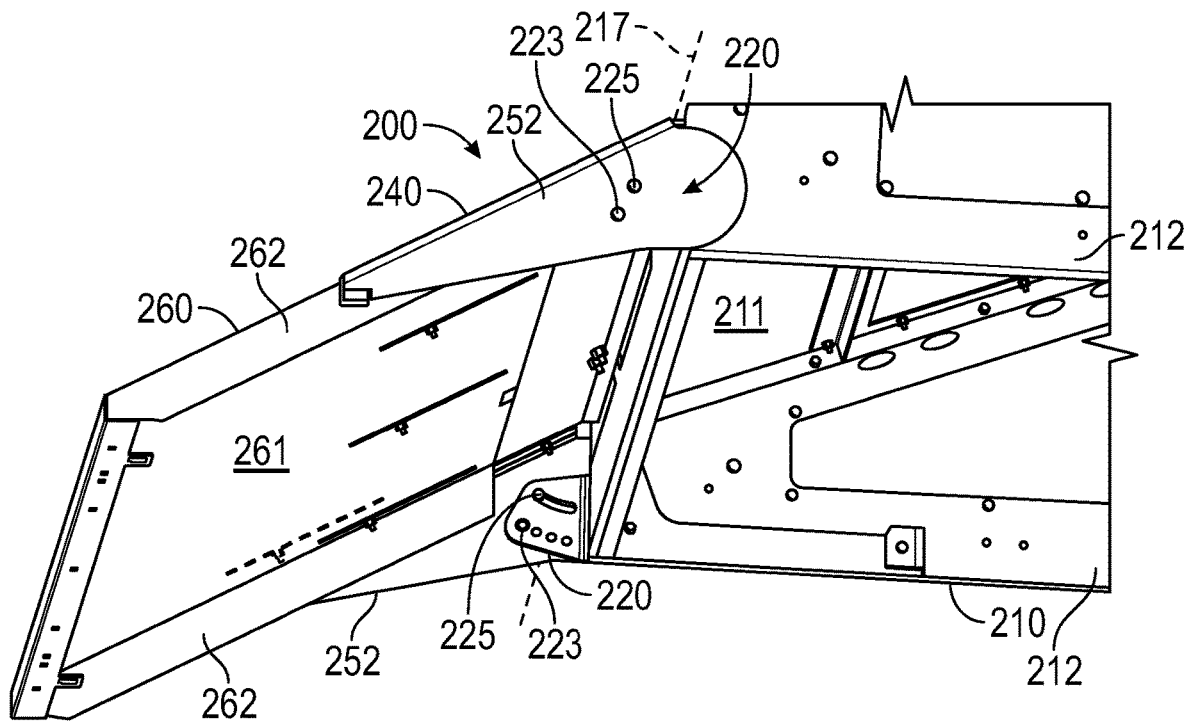
FIG. 6 is a bottom, right perspective view of the canopy of FIG. 5.

Referring now to FIGS. 5 and 6, the canopy assembly 200 is shown according to an exemplary embodiment. As shown, the cover 210 includes a top portion (e.g., a top wall, a main body, etc.), shown as top plate 211, that defines a top surface of the cover 210 and a pair of side portions (e.g., side walls, flanges, etc.), shown as side plates 212, that define a left surface and a right surface of the cover 210, respectively. The side plates 212 are fixedly coupled to and extend substantially perpendicular to the top plate 211. The top plate 211 is generally rectangular. The side plates 212 are generally trapezoidal. A rear end portion of the cover 210 is fixedly coupled (e.g., fastened, welded, etc.) to the body 120 of the refuse vehicle 100. A front end portion of each side plate 212 is fixedly coupled to (e.g., welded to, fastened to, formed as a single continuous piece with, etc.) a body, shown a bracket 220.

As shown, the hood 240 includes a top portion (e.g., a top wall, a top panel, a main body, etc.), shown as top plate 251, that defines a top surface of the hood 240 and a pair of side portions (e.g., side walls, flanges, etc.), shown as side plates 252, that define a left surface and a right surface of the hood 240, respectively. The side plates 252 are fixedly coupled to and extend substantially perpendicular to the top plate 251. The top plate 251 is generally rectangular. The side plates 252 are generally tapered such that a height of each side plate 252 decreases from the rear to the front of the hood 240. The side plates 252 each extend along an outer surface of one of the side plates 212.

Figure 7:
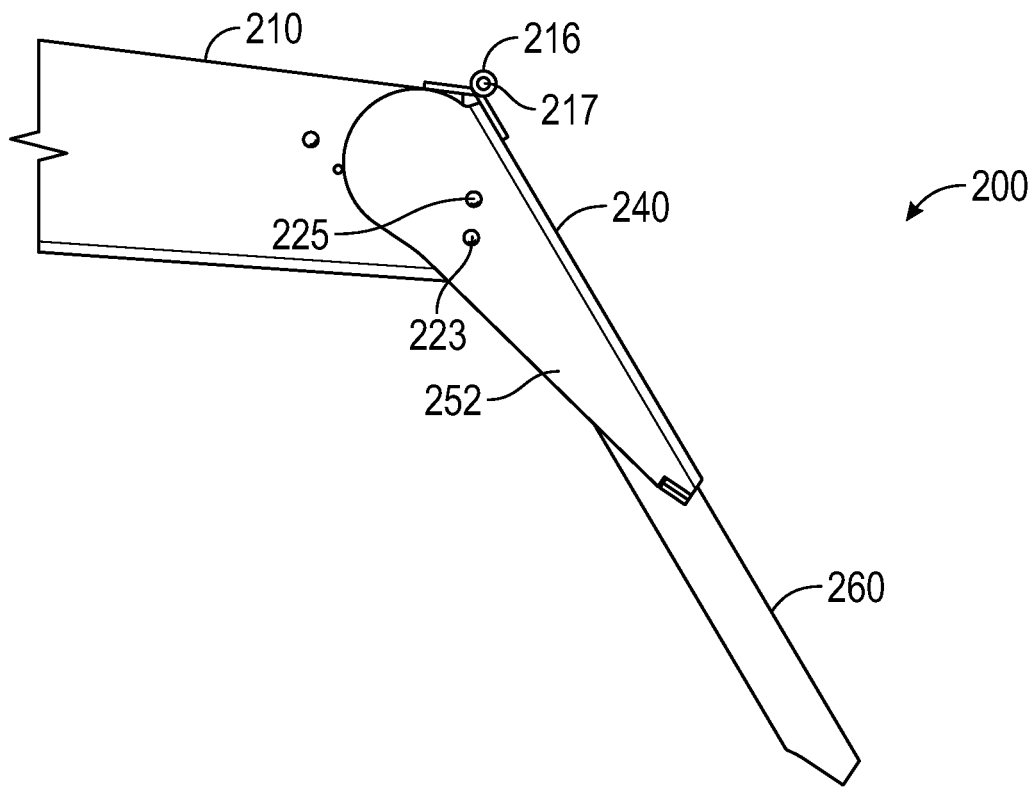
FIGS. 7 and 8 are left side views of the canopy of FIG. 5 in various configurations.
Figure 8:
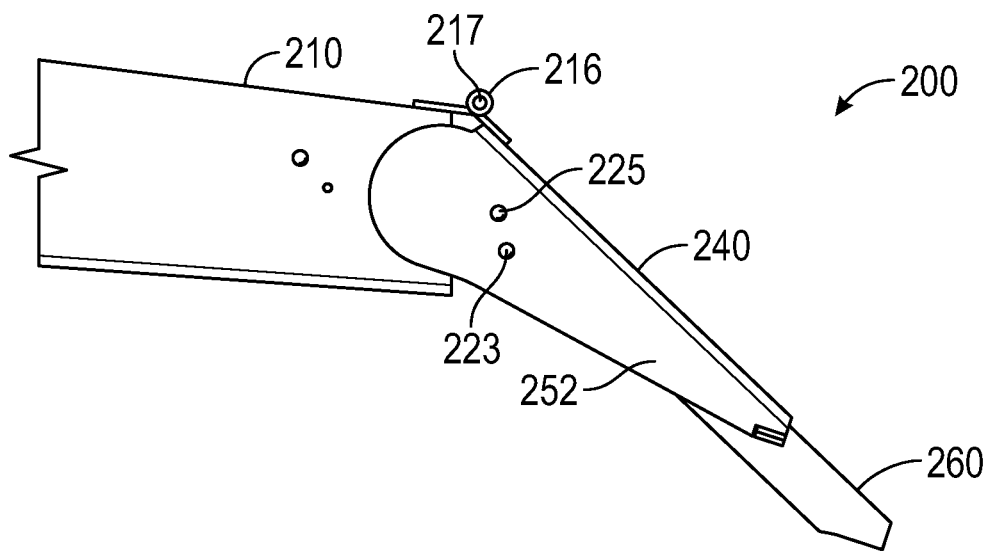

As shown in FIGS. 5-8, a rear end portion of the hood 240 is pivotally coupled to a front end portion of the cover 210. Specifically, the hood 240 is pivotally coupled to the cover by a pair of pivotal couplers, shown as hinges 216. The hood 240 is configured to rotate relative to the cover 210 about a lateral of rotation, shown as axis 217, that extends through the centers of the hinges 216. FIGS. 7 and 8 illustrate a rotational range of motion of the hood 240 between a lowermost or bottom position, shown in FIG. 7, and an uppermost or top position, shown in FIG. 8, according to an exemplary embodiment. In other embodiments, the canopy assembly 200 is configured with different top and/or bottom positions (e.g., has a smaller range of motion, has a larger range of motion, has a range of motion containing different positions, etc.). In some embodiments, the hood 240 is angled below a horizontal plane throughout the range of motion.

As shown, the lip 260 includes a top portion (e.g., a top wall, a main body, etc.), shown as top plate 261, that defines a top surface of the lip 260 and a pair of side portions (e.g., side walls, flanges, etc.), shown as side plates 262, that define a left surface and a right surface of the lip 260, respectively. The side plates 262 are fixedly coupled to and extend substantially perpendicular to the top plate 261. The top plate 261 is generally rectangular. The side plates 262 have a generally constant height. The side plates 252 each extend along an outer surface of one of the side plates 262. The lip 260 is slidably coupled to the hood 240 such that the lip 260 is selectively repositionable in a longitudinal direction along the length of the hood 240. The lip 260 may be repositioned to vary an overall length of the canopy assembly 200. FIGS. 7 and 8 illustrate a translational range of motion of the lip 260 between a fully extended position, shown in FIG. 7, and a fully retracted position, shown in FIG. 8, according to an exemplary embodiment. In other embodiments, the canopy assembly 200 is configured with different fully extended and/or fully retracted positions (e.g., has a smaller range of motion, has a larger range of motion, has a range of motion containing different positions, etc.).

Figure 9:
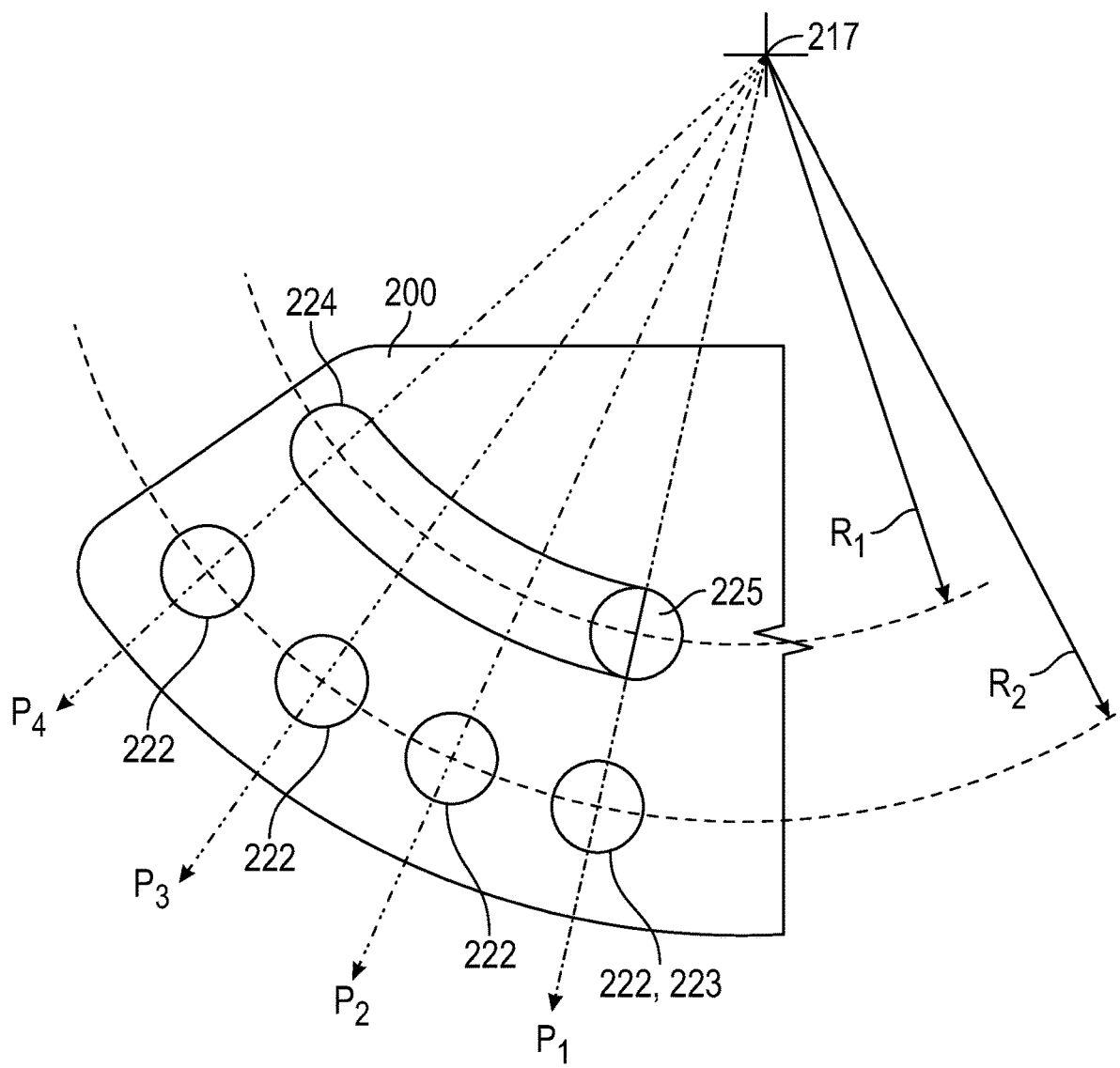
FIG. 9 is a side view of a bracket of bracket of the canopy of FIG. 5.

Referring to FIGS. 6 and 9, the bracket 220 defines a series of index apertures, shown as index holes 222, and an elongated aperture or curved slot, shown as guide slot 224. The index holes 222 and the guide slot 224 extend laterally through the entire thickness of the bracket 220. The guide slot 224 extends along a path that is centered about the axis 217. Specifically, the center of the guide slot 224 is positioned at a radius $R_1$ from the axis 217. The guide slot 224 extends from an angular position $P_1$ to an angular position $P_4$. As shown, the bracket 220 defines four index holes 222. In other embodiments, the bracket 220 defines more or fewer index holes 222. The index holes 222 are each positioned equiradially (i.e., at the same radius $R_2$) from the axis 217. As shown, the radius $R_1$ is less than the radius $R_2$. In other embodiments, the radius $R_1$ is greater than or equal to the radius $R_2$. As shown, each index hole 222 is located at a different angular position, shown as angular position $P_1$, angular position $P_2$, angular position $P_3$, and angular position $P_4$, respectively. As shown, each angular position is offset from an adjacent angular position by an equal angle (i.e., the angle between $P_1$ and $P_2$, the angle between $P_2$ and $P_3$, and the angle between $P_3$ and $P_4$ are all substantially equal). In other embodiments, the angles between the angular positions differ.

Referring to FIGS. 6-9, the canopy assembly 200 further includes two pairs of stops (e.g., pins, fasteners, protrusions, etc.), shown as pins 223 and pins 225, that control rotation of the hood 240 relative to the cover 210. The pins 223 and the pins 225 are each coupled (e.g., removably, fixedly, etc.) to one of the side plates 252 (e.g., by inserting the pin 223 through an aperture defined by the side plate 252, by welding the pin 223 to the side plate, etc.). The pin 223 is positioned to extend through one of the index holes 222, and the pin 225 is positioned to extend through the guide slot 224. Specifically, the pin 223 is centered at the radius $R_2$, and the pin 225 is centered at the radius $R_1$. Because the radii $R_1$ and $R_2$ are centered about the axis of rotation 217 of the hood 240, the pins 223 align with different index holes 222 and the pins 225 move along the length of the guide slot 224 as the hood 240 is rotated. The pin 223 is selectively repositionable between different index holes 222 to control the orientation of the hood 240 (e.g., reposition the hood 240 between a finite number of discrete angular positions). In the embodiment shown in FIG. 9, the pin 223 extends through the index hole 222 at the angular position $P_1$. While the pins 223 are coupled to the side plates 252 and inserted through this index hole, the hood 240 is fixed in an angular position associated with this index hole 222. The pin 223 may be selectively removed from this index hole 222 to permit free rotation of the hood 240 relative to the cover 210. The pins 223 may then be replaced into another of the index holes 222 to fix the hood 240 in a different angular position. By way of example, the pins 223 may be moved from the index holes at the angular position $P_1$ into the index holes 222 at the angular position $P_2$ to rotate the hood 240 upward by the angular distance between the angular position $P_1$ and the angular position $P_2$.

The pins 225 engage the guide slots 224 to guide the rotation of the hood 240 (e.g., when the pins 223 have been removed from the index holes 222). As the hood 240 rotates, the pins 223 move along the length of the guide slots 224. Engagement of the pins 225 with the ends of the guide slots 224 limits rotation of the hood 240 (e.g., defines the uppermost and lowermost angular positions of the hood 240). Engagement of the pins 225 with the walls of the guide slots 224 may support the hood 240 to facilitate smooth rotation of the hood 240. In some embodiments, the pins 225 are fasteners (e.g., bolts, nuts, etc.) that are tightened when the hood 240 is in the desired position, pressing the brackets 220 against the side plates 252 such that friction resists movement of the hood 240.

As shown in FIG. 6, the bracket 220 is shown as having four index holes 222 and one guide slot 224. In other embodiments, the bracket 220 may include more or fewer index holes 222. The bracket 220 may include more or fewer guide slots 224. In other embodiments, the index holes 222 may be spaced at different distances from the axis 217. In such an embodiment, each side plate 252 may be coupled to multiple pins 223. In other embodiments, one or more of the index holes 222 and/or the guide slots 224 are defined by the side plates 252 and the pins 223 and/or 225 are coupled to the brackets 220. In yet other embodiments, the hood 240 may be coupled to the cover 210 by a different type of mount such that the hood 240 is repositionable relative to the cover 210.

In FIG. 7, the hood 240 is shown in a first angular position or orientation (e.g., corresponding to the angular position $P_1$). In FIG. 8, the hood 240 is shown in a second angular position or orientation (e.g., corresponding to the angular position $P_4$). The hood 240 is selectively rotatable relative to the cover 210 about the axis 217 between various angular positions. The lip 260 rotates in unison with the hood 240 relative to the cover 210.

Figure 10:
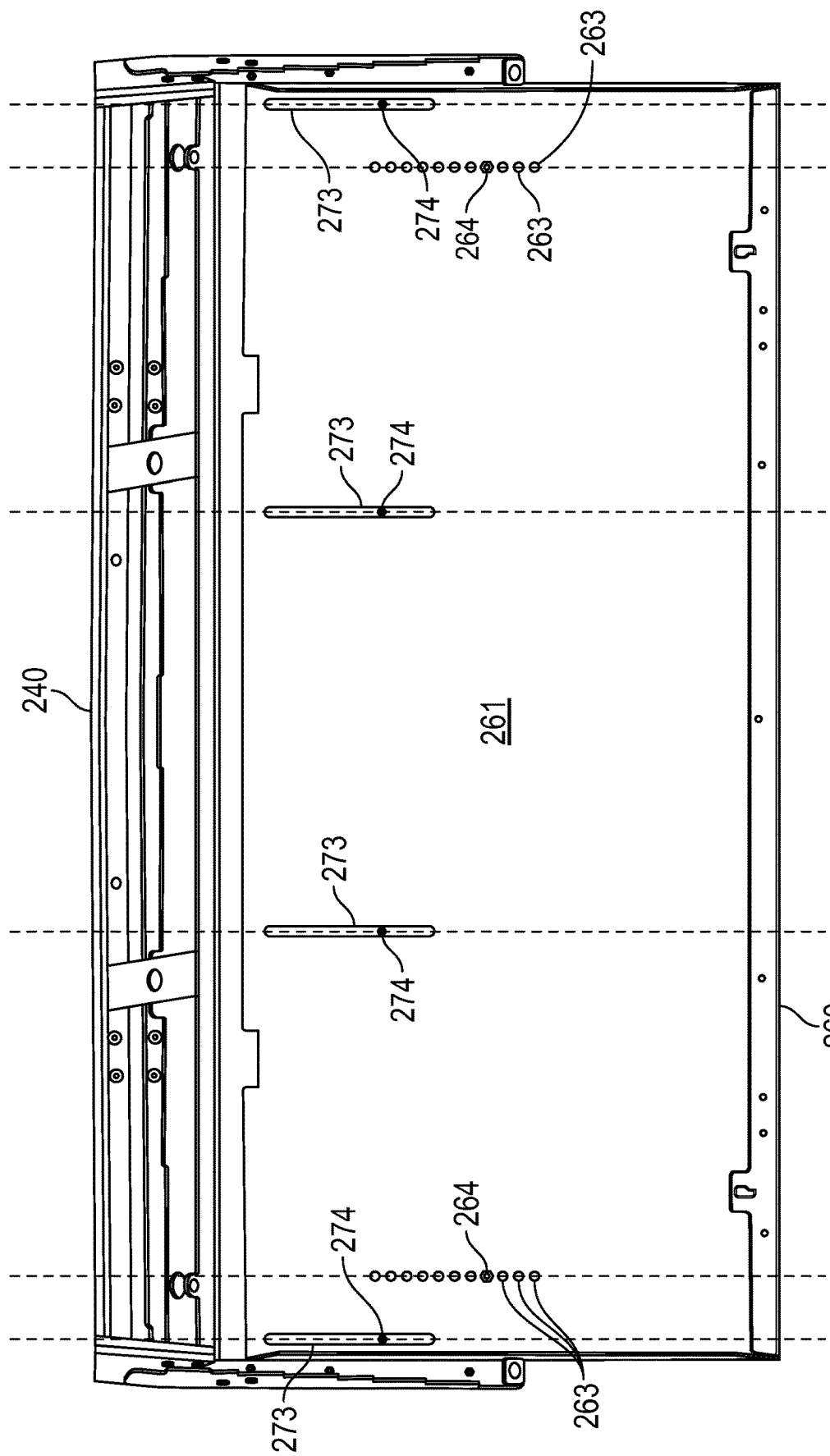
FIGS. 10 and 11 are bottom views of the canopy of FIG. 5 in various configurations.
Figure 11:
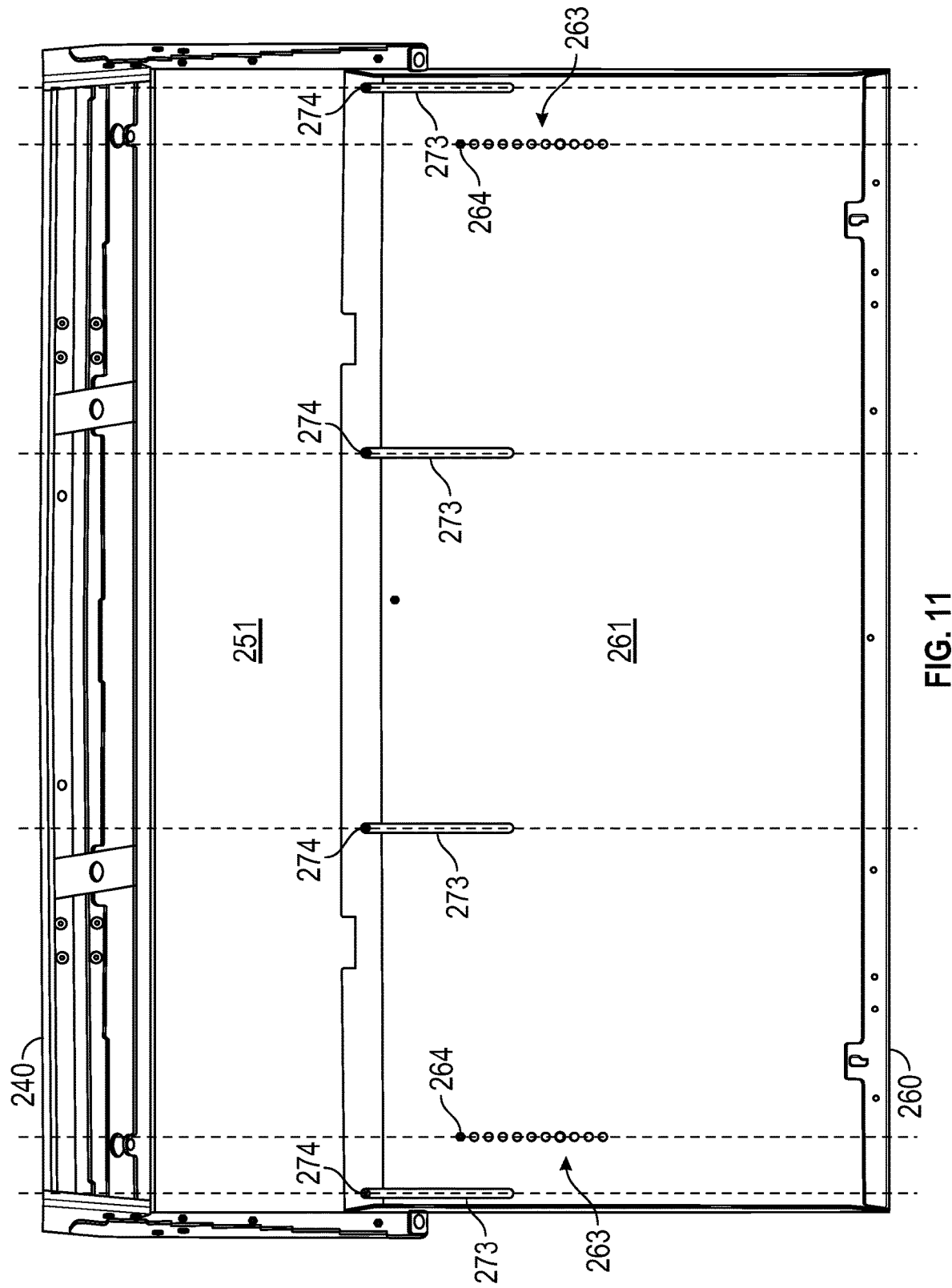

Referring to FIGS. 7, 8, 10, and 11, the lip 260 selectively longitudinally repositionable relative to the hood 240 between a fully extended position and a fully retracted position to vary an overall length of the canopy assembly 200. Specifically, the lip 260 is selectively translatable perpendicular to the axis 217, telescoping into or out of (e.g., extending or retracting) the hood 240. The top plate 261 slides along (e.g., parallel to) an inner surface of the top plate 251. FIGS. 7, 8, and 10 illustrate various partially extended positions of the lip 260. FIG. 11 illustrates a fully extended position of the lip 260. By extending or retracting the lip 260, the canopy assembly 200 may be reconfigured to cover larger or smaller cab configurations.

Figure 12:
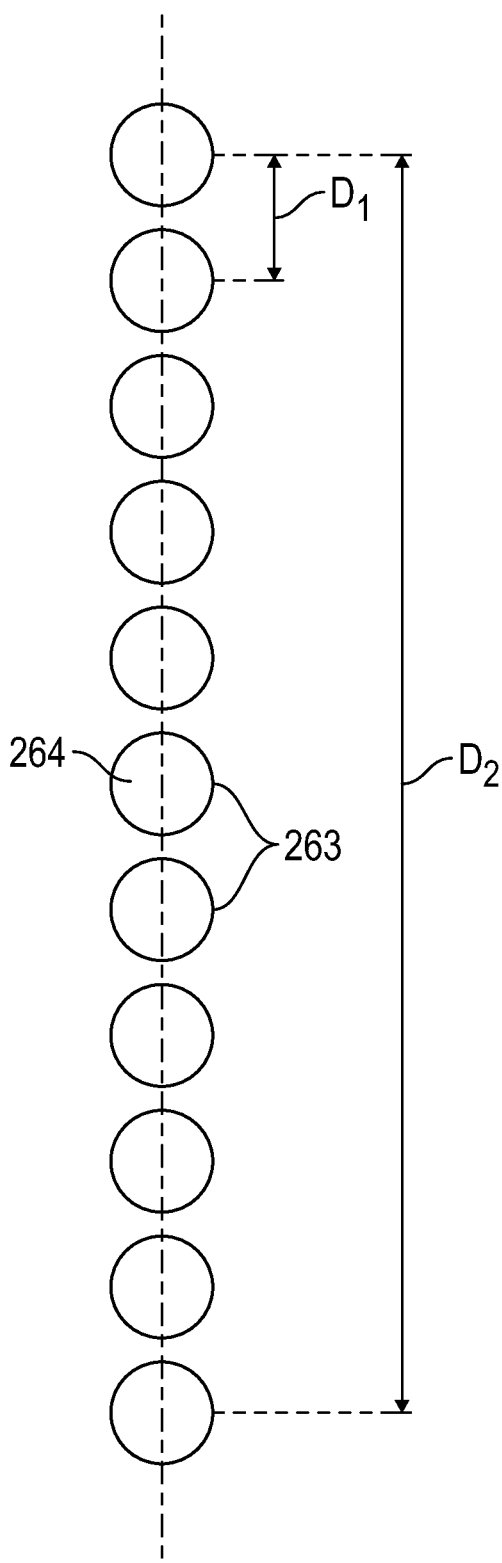
FIG. 12 is a top view of a group of index holes of the canopy of FIG. 5.
Figure 13:
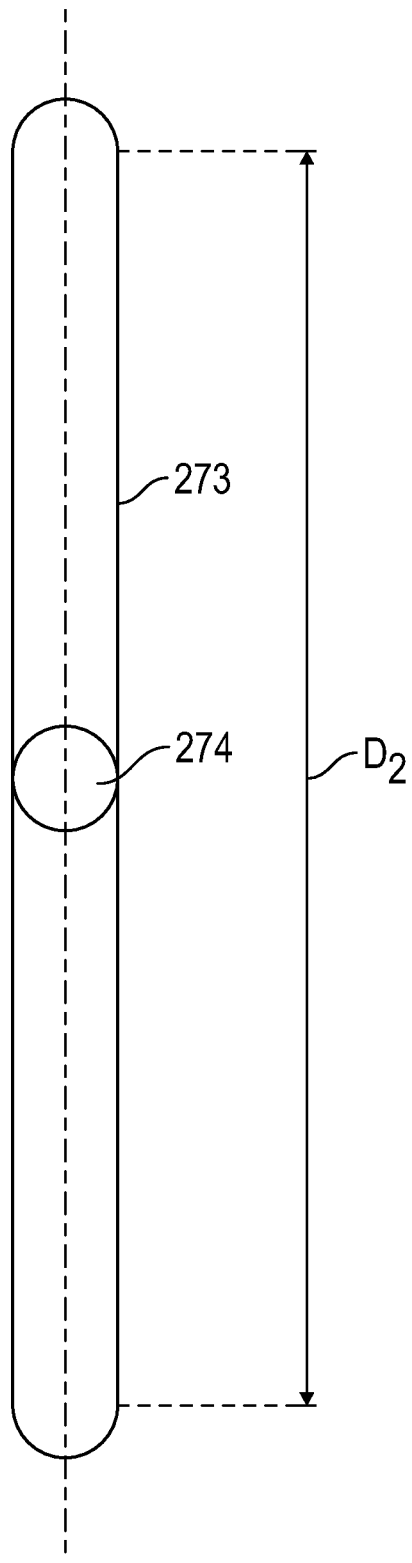
FIG. 13 is a top view of a guide slot of the canopy of FIG. 5.

Referring to FIGS. 10-13, the lip 260 defines a series of index apertures, shown as index holes 263, and a series of elongated apertures or linear slots, shown as guide slots 273. The index holes 263 and the guide slots 273 extend vertically through the entire thickness of the top plate 261. Specifically, the lip 260 defines two groups of index holes 263. Each group includes multiple index holes 263 that are longitudinally offset from one another and laterally centered with one another (i.e., centered along a longitudinal axis). As shown in FIG. 12, within each group each index hole 263 is longitudinally offset from an adjacent index hole 263 by a distance $D_1$. The two most distant index holes 263 are offset from one another by a distance $D_2$. The lip 260 defines four guide slots 273, each of which extend longitudinally, substantially parallel to one another. The guide slots 273 each have a length $D_2$.

The canopy assembly 200 further includes two sets of stops (e.g., pins, fasteners, protrusions, etc.), shown as pins 264 and pins 274, that control translation of the lip 260 relative to the hood 240 (e.g., reposition the lip 260 between a finite number of discrete longitudinal positions). The pins 264 and the pins 274 are each positioned at different lateral positions along the top plate 251. The pins 264 and the pins 274 are each coupled (e.g., removably, fixedly, etc.) to top plate 251 (e.g., by inserting the pin 264 through an aperture defined by the top plate 251, by welding the 264 to the top plate 251, etc.). The pins 264 are each positioned to extend through one of the index holes 263, and the pins 274 are each positioned to extend through one of the guide slots 273. Each pin 264 is associated with one of the groups of index holes 263. The pins 264 are selectively repositionable between different index holes 263 of the corresponding group to control the longitudinal position of the lip 260 relative to the hood 240. When one of the pins 264 is inserted through one of the index holes 263, the lip 260 is fixed in a longitudinal position corresponding to that index hole 263. The other pin 264 may be inserted through the same index hole 263 of the other group to further secure the lip 260. The pin 264 may be selectively removed from the index holes 263 to permit free translation of the lip 260 relative to the hood 240. The pins 264 may then be replaced into another of the index holes 263 to fix the lip 260 in a different longitudinal position.

The pins 274 engage the guide slots 263 to guide the translation of the lip 260 (e.g., when the pins 264 have been removed from the index holes 263). As the lip 260 translates, the pins 274 move along the length of the guide slots 273. Engagement of the pins 274 with the ends of the guide slots 273 limits translation of the lip 260 (e.g., defines the fully extended and fully retracted positions of the lip 260). Engagement of the pins 274 with the walls of the guide slots 273 may limit lateral movement of the lip 260 and facilitate smooth movement of the lip 260. In some embodiments, the pins 274 are fasteners (e.g., bolts, nuts, etc.) that are tightened when the lip 260 is in the desired position, pressing the top panel 261 against the top plate 251 such that friction resists movement of the lip 260. The pins 274 may limit vertical movement of the lip 260 relative to the hood 240.

In other embodiments, the lip 260 may include more or fewer index holes 263 and/or groups of index holes 263. Additionally, the lip 260 may include more or fewer guide slots 273. Alternatively, the lip 260 may include a mount configured to selectively and slidably couple the lip 260 to the hood 240. In other embodiments, one or more of the index holes 263 and/or the guide slots 273 are defined by the top plate 251 and the pins 264 and/or the pins 274 are coupled to the top plate 261. In yet other embodiments, the lip 260 may be coupled to the hood 240 by a different type of mount such that the lip 260 is repositionable relative to the hood 240.

In the embodiment shown in FIGS. 1 and 2, the refuse vehicle 100 is a front loading refuse vehicle. In other embodiments, the canopy assembly 200 is used with other types of vehicles (e.g., concrete mixer trucks, tractors, telehandlers, other types of refuse vehicles, etc.). Referring to the exemplary embodiment of FIG. 11, a side loading refuse vehicle 300 is shown that utilizes the canopy assembly 200. The side loading refuse vehicle 300 includes a body 320 that stores refuse and a lift assembly 340 that introduces refuse into the body 320. The lift assembly 340 includes a guide or track 342 fixedly coupled to the body 320 and a manipulator or grabber, shown as arm 344, that is selectively repositionable along the track 342. The arm 344 extends laterally outward from the body 320 to engage a refuse container RC. The arm 344 lifts the refuse container RC along the track 342 and deposits the refuse into the body 320.

Referring to the exemplary embodiment of FIG. 12, a rear loading refuse vehicle 400 is shown that utilizes the canopy assembly 200. The rear loading refuse vehicle 400 includes a body 420 that stores refuse and a lift assembly 440 that introduces refuse into the body 320. The lift assembly 440 is positioned at a rear end of the body 320. In some embodiments, a user introduces refuse into the lift assembly 440 by hand.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Figure 14:
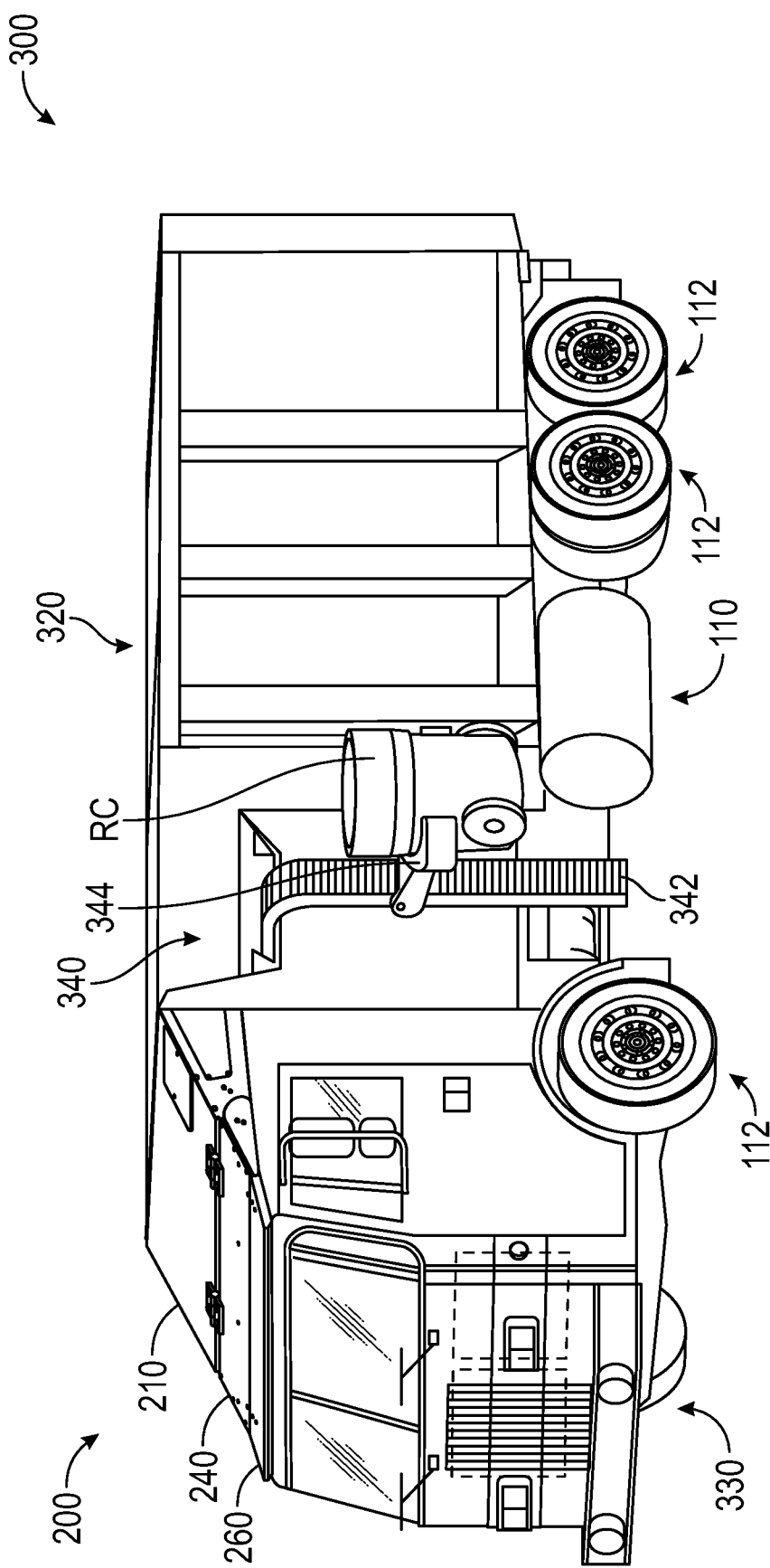
FIG. 14 is a front, right perspective view of a refuse vehicle, according to an exemplary embodiment.
Figure 15:
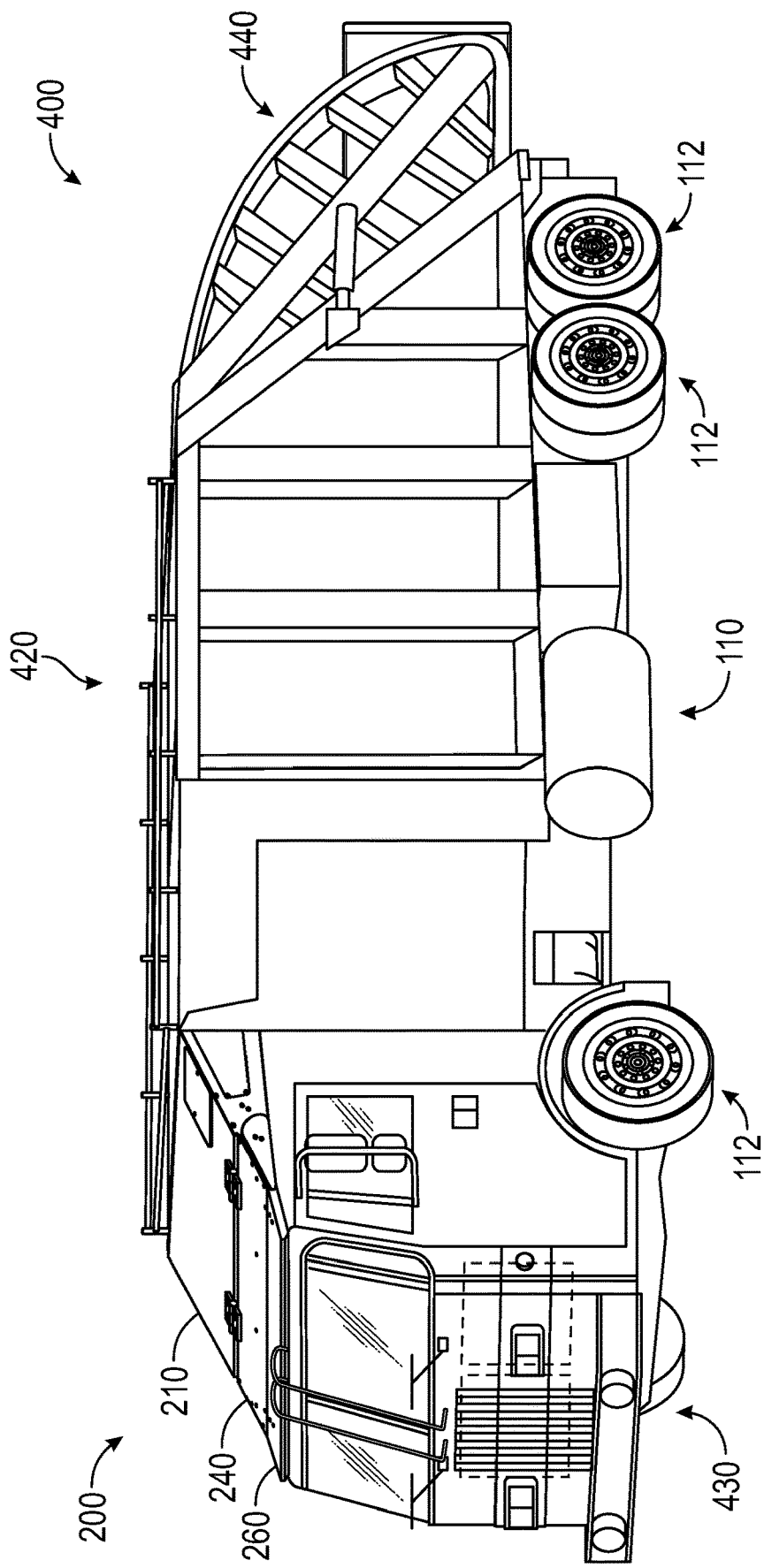
FIG. 15 is a front, right perspective view of a refuse vehicle, according to an exemplary embodiment.

It is important to note that the construction and arrangement of the refuse vehicles as shown in the various exemplary embodiments is illustrative only. Additionally, any element disclosed in one embodiment may be incorporated or utilized with any other embodiment disclosed herein. For example, the canopy assembly 200 of the exemplary embodiment shown in at least FIG. 5 may be incorporated in the side loading refuse vehicle 300 of the exemplary embodiment shown in at least FIG. 14. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle, comprising:
a chassis;
a body configured to store refuse;
a cab coupled to the chassis; and
a canopy assembly extending directly above the cab, the canopy assembly including:
a main body fixedly coupled to the chassis;
an adjustable panel pivotally coupled to the main body and selectively rotatable relative to the main body about a lateral axis, wherein at least one of the main body or the adjustable panel defines a plurality of index apertures corresponding to one of a plurality of angular positions of the adjustable panel relative to the main body;
a lip slidably coupled to the adjustable panel and translatable longitudinally relative to the adjustable panel; and
a first pin selectively repositionable between the plurality of index apertures to selectively fix the adjustable panel in one of the plurality of angular positions.

2. The refuse vehicle of claim 1, wherein the adjustable panel is selectively repositionable relative to the main body between a finite number of discrete angular positions.

3. The refuse vehicle of claim 2, wherein the lip is selectively repositionable relative to the adjustable panel between a finite number of discrete longitudinal positions.

4. The refuse vehicle of claim 1, wherein the one of the main body or the adjustable panel defines a slot, further comprising a second pin coupled to the other of the main body and the adjustable panel and extending into the slot, wherein the second pin moves along a length of the slot as the adjustable panel rotates relative to the main body.

5. The refuse vehicle of claim 1, wherein the main body, the adjustable panel, and the lip define a top surface of the canopy assembly.

6. The refuse vehicle of claim 1, wherein the adjustable panel is pivotally coupled to the main body and selectively repositionable relative to the main body between the plurality of angular positions.

7. The refuse vehicle of claim 1,
wherein the adjustable panel is slidably coupled to the main body and selectively translatable relative to the main body between a plurality of longitudinal positions.

8. The refuse vehicle of claim 1,
wherein the adjustable panel is rotatable relative to the main body about a lateral axis between a finite number of discrete angular positions; and
wherein the adjustable panel is translatable longitudinally relative to the main body between a finite number of discrete longitudinal positions.

9. The refuse vehicle of claim 8, further comprising a lift assembly coupled to the chassis, wherein the lift assembly is configured to lift a refuse container over the canopy assembly to introduce refuse from the refuse container into the main body, and wherein the refuse vehicle is a front loading refuse vehicle.

10. A refuse vehicle, comprising:
a chassis;
a body configured to store refuse;
a cab coupled to the chassis; and
a canopy assembly extending directly above the cab, the canopy assembly including:
a main body fixedly coupled to the chassis;
an hood pivotally coupled to the main body and selectively rotatable relative to the main body about a lateral axis; and
a lip slidably coupled to the hood and translatable longitudinally relative to the hood,
wherein one of the hood or the lip defines a plurality of index apertures offset from longitudinally one another, each index aperture corresponding to a longitudinal position of the lip relative to the hood, further comprising a first pin electively repositionable between the plurality of index apertures to selectively fix the lip in one of a plurality of longitudinal positions.

11. The refuse vehicle of claim 10, wherein the one of the hood or the lip defines a slot, further comprising a second pin coupled to the other of the hood and the lip and extending into the slot, wherein the second pin moves along a length of the slot as the lip translates relative to the hood.

12. A canopy assembly for a refuse vehicle, comprising:
a cover configured to be fixedly coupled to a chassis of the refuse vehicle;
a hood pivotally coupled to the cover and selectively rotatable relative to the cover about a lateral axis, wherein one of the hood or the cover defines a first index aperture and a second index aperture;
a lip slidably coupled to the hood and selectively repositionable relative to the hood between a plurality of longitudinal positions; and
a pin that is selectively repositionable between the first index aperture and the second index aperture, wherein the pin is configured to:
fix the hood in a first angular position relative to the cover when the pin is inserted into the first index aperture, and
fix the hood in a second angular position relative to the cover when the pin is inserted into the second index aperture,
wherein the cover, the hood, and the lip define a top surface of the canopy assembly.

13. The canopy assembly of claim 12, further comprising a protrusion coupled to one of the lip or the hood, wherein the other of the hood or the cover defines a slot that receives the protrusion, and wherein the protrusion is configured to move along a length of the slot when the hood rotates about the lateral axis.

14. A canopy assembly for a refuse vehicle, comprising:
a cover configured to be fixedly coupled to a chassis of the refuse vehicle;
a hood pivotally coupled to the cover and selectively rotatable relative to the cover about a lateral axis;
a lip slidably coupled to the hood and selectively repositionable relative to the hood between a plurality of longitudinal positions; and
a protrusion coupled to one of the hood or the cover, wherein one of the hood or the cover defines a slot that receives the protrusion, and wherein the protrusion is configured to move along a length of the slot when the hood rotates about the lateral axis.

15. The canopy assembly of claim 14, wherein one of the lip or the hood defines a first index aperture and a second index aperture, further comprising a pin that is selectively repositionable between the first index aperture and the second index aperture, wherein the pin is configured to fix the lip in a first longitudinal position relative to the hood when the pin is inserted into the first index aperture, and wherein the pin is configured to fix the lip in a second longitudinal position relative to the hood when the pin is inserted into the second index aperture.

16. A method of installing a canopy onto a refuse vehicle, comprising:
providing a refuse vehicle including a chassis, a cab coupled to the chassis, and a body configured to store refuse;
fixedly coupling a cover to the chassis such that the cover extends over the cab;
movably coupling an adjustable panel to the cover such that the adjustable panel extends over the cab, wherein at least one of the cover or the adjustable panel defines a plurality of index apertures;
slidably coupling a lip to the adjustable panel such that the lip extends over the cab;
adjusting at least one of (a) a position of the adjustable panel relative to the cover or (b) an orientation of the adjustable panel relative to the cover comprising:
rotating the adjustable panel relative to the cover about a lateral axis from a first angular position to a second angular position and providing a first pin through one of the plurality of index apertures to selectively fix the adjustable panel to the cover; and
translating the lip relative to the adjustable panel from a first longitudinal position to a second longitudinal position.

* * * * *